United States Patent
Nakano et al.

(10) Patent No.: US 7,396,863 B2
(45) Date of Patent: Jul. 8, 2008

(54) INK SET

(75) Inventors: Yukihiro Nakano, Wakayama (JP);
Shigeki Nagashima, Wakayama (JP);
Hiroki Kubo, Wakayama (JP);
Michitaka Sawada, Wakayama (JP)

(73) Assignee: Kao Corporation, Tokyo (JP)

( * ) Notice: Subject to any disclaimer, the term of this patent is extended or adjusted under 35 U.S.C. 154(b) by 132 days.

(21) Appl. No.: 10/169,201

(22) PCT Filed: Dec. 26, 2000

(86) PCT No.: PCT/JP00/09273

§ 371 (c)(1),
(2), (4) Date: Jun. 28, 2002

(87) PCT Pub. No.: WO01/48099

PCT Pub. Date: Jul. 5, 2001

(65) Prior Publication Data

US 2003/0087988 A1    May 8, 2003

(30) Foreign Application Priority Data

Dec. 28, 1999   (JP)  ................................. 11-374968

(51) Int. Cl.
*C09D 11/00*   (2006.01)
(52) U.S. Cl. .................... 523/160; 523/161; 106/31.27; 106/31.6; 524/556; 524/558
(58) Field of Classification Search .................. 523/160, 523/161; 106/31.27, 31.6; 524/556, 588
See application file for complete search history.

(56) References Cited

U.S. PATENT DOCUMENTS

| | | | | |
|---|---|---|---|---|
| 5,179,158 A | * | 1/1993 | Azuma et al. | ............... 524/748 |
| 5,713,993 A | | 2/1998 | Grezzo Page et al. | |
| 5,852,074 A | | 12/1998 | Tsutsumi et al. | |
| 5,998,501 A | | 12/1999 | Tsutsumi et al. | |
| 6,005,023 A | * | 12/1999 | Anton et al. | ............... 523/161 |
| 6,031,019 A | * | 2/2000 | Tsutsumi et al. | ............ 523/160 |
| 6,036,759 A | | 3/2000 | Wickramanayake et al. | |
| 6,121,370 A | | 9/2000 | Ozaki et al. | |
| 6,247,808 B1 | | 6/2001 | Ma et al. | |
| 6,342,095 B1 | | 1/2002 | Takizawa et al. | |
| 6,386,695 B1 | * | 5/2002 | Kowalski | ..................... 347/100 |
| 6,652,084 B1 | * | 11/2003 | Teraoka et al. | .............. 347/100 |
| 2002/0006982 A1 | * | 1/2002 | Kurabayashi | ............... 523/161 |

FOREIGN PATENT DOCUMENTS

| | | |
|---|---|---|
| EP | 692527 A2 | 1/1996 |
| EP | 791610 A2 | 8/1997 |
| EP | 857766 A1 | 8/1998 |
| EP | 864437 A1 | 9/1998 |
| EP | 953616 A2 | 11/1999 |
| JP | 56-58871 | 5/1981 |
| JP | 64-58583 | 3/1989 |
| JP | 9-183224 | 7/1997 |
| JP | 10-140064 | 5/1998 |
| JP | 10-338829 A | 12/1998 |
| JP | 11-61017 A | 3/1999 |
| JP | 2000-191972 A | 7/2000 |

OTHER PUBLICATIONS

Machine Translation of JP 2000-191972 A.*

* cited by examiner

*Primary Examiner*—Edward J Cain
(74) *Attorney, Agent, or Firm*—Birch, Stewart, Kolasch & Birch, LLP

(57) ABSTRACT

An ink set comprising a black ink and a color ink, wherein the black ink comprises an aqueous dispersion of water-insoluble vinyl polymer particles containing an oil-soluble black dye or carbon black, the vinyl polymer particles have an ionicity opposite to that of the color ink, and the vinyl polymer comprises a water-insoluble vinyl polymer prepared by copolymerizing (a) a salt forming group-containing monomer, (b) a monomer represented by the formula (I):

$$CH_2=C(R^1)COO(R^2O)_pR^3 \qquad (I)$$

wherein $R^1$ is hydrogen atom or a lower alkyl group, $R^2$ is a divalent hydrocarbon group which may have a hetero-atom, $R^3$ is a monovalent hydrocarbon group which may have a hetero-atom, and p is a number of 1 to 60, (c) a macromer, and (d) a monomer copolymerizable with these monomers. The ink set can be used as an ink set for inkjet recording, which is excellent in not only fixing abilities and water resistance, but also bleeding resistance and jettability, and can form very clear printouts.

4 Claims, No Drawings

INK SET

This application is the national phase under 35 U.S.C. § 371 of PCT International Application No. PCT/JP00/09273 which has an International filing date of Dec. 26, 2000, which designated the United States of America.

TECHNICAL FIELD

The present invention relates to an ink set. More specifically, the present invention relates to an ink set which can be suitably used for an ink set for inkjet recording.

BACKGROUND ART

Inkjet recording is a recording system for forming characters or images, comprising directly jetting ink droplets from very fine nozzles to a recording medium, and depositing the ink droplets on the recording medium. This system has advantages that not only the used device shows excellent operability at a low level of noise, but also the coloration is facilitated and plain paper can be used as a recording medium. Therefore, this system has been widely used in the recent years.

As an ink set comprising a black ink and a color ink usable for color inkjet printers, there have been known an ink set comprising an acidic black ink comprising an acidic carbon black, a basic surfactant and a water-soluble organic solvent, and a basic color ink (Japanese Patent Laid-Open No. Hei 9-183224); an ink set comprising a black ink comprising a self-dispersible carbon black in which at least one hydrophilic group is bonded directly or via the other group of atoms to the surface of the carbon black, and a color ink comprising a colorant having a polarity opposite to the colorant used in the black ink (Japanese Patent Laid-Open No. Hei 10-140064); and the like.

However, the printouts formed by using these inks are wrong especially in fixing abilities such as rubbing resistance and high-lighter fastness in the black ink, and are not sufficiently satisfactory in these properties, while printouts formed by using there ink sets are excellent in bleeding resistance.

DISCLOSURE OF INVENTION

An object of the present invention is to provide an ink set for inkjet recording, which is excellent in not only fixing abilities and water resistance, but also bleeding resistance and jettability, and can form very clear printouts.

The present invention relates to an ink set comprising a black ink and a color ink, wherein the black ink comprises an aqueous dispersion of water-insoluble vinyl polymer particles containing an oil-soluble black dye or carbon black, the vinyl polymer particles have an ionicity opposite to that of the color ink, and the vinyl polymer comprises a water-insoluble vinyl polymer prepared by copolymerizing (a) a salt forming group-containing monomer [hereinafter referred to as component (a)], (b) a monomer represented by the formula (I):

$$CH_2=C(R^1)COO(R^2O)_p R^3 \quad (I)$$

wherein $R^1$ is hydrogen atom or a lower alkyl group, $R^2$ is a divalent hydrocarbon group which may have a hetero-atom, $R^3$ is a monovalent hydrocarbon group which may have a hetero-atom, and p is a number of 1 to 60 [hereinafter referred to as component (b)], (c) a macromer [hereinafter referred to as component (c)], and (d) a monomer copolymerizable with these monomers [hereinafter referred to as component (d)].

BEST MODE FOR CARRYING OUT THE INVENTION

As a vinyl polymer used in the aqueous dispersion, a water-insoluble vinyl polymer is used. In order to obtain a water-based ink having both high fixing ability and high dispersion stability, there is used a water-insoluble vinyl polymer obtained by copolymerizing the component (a), the component (b), the component (c) and the component (d).

The salt-forming group refers to a group which can form a cationic group or an anionic group when the group is neutralized with an acid or a base.

Representative examples of the component (a) include the cationic monomers and the anionic monomers described in page 5, column 7, line 24 to column 8, line 29 of Japanese Patent Laid-Open No. Hei 9-286939.

The cationic monomer includes tertiary amine-containing unsaturated monomers, ammonium salt-containing unsaturated monomers, and the like. Among them, N,N-dimethylaminoethyl acrylate, N,N-dimethylaminoethyl methacrylate, N-(N',N'-dimethylaminopropyl) acrylamide, N-(N',N'-dimethylaminopropyl) methacrylamide and vinylpyrrolidone are preferable.

The anionic monomer includes unsaturated carboxylic acid monomers, unsaturated sulfonic acid monomers, unsaturated phosphoric acid monomers, and the like. Among them, unsaturated carboxylic acid monomers, especially acrylic acid and methacrylic acid are preferable.

The component (b) exhibits an excellent effect of suppressing the generation of distortion even when printing is continuously carried out because the component (b) increases the jetting stability of the water-based ink of the present invention.

In the formula (I), $R^1$ is hydrogen atom or a lower alkyl group. The lower alkyl group includes linear or branched alkyl groups having 1 to 4 carbon atoms.

$R^2$ is a divalent hydrocarbon group which may have a hetero-atom. The hetero-atom includes, for example, nitrogen atom, oxygen atom, a halogen atom and sulfur atom.

Representative examples of $R^2$ include an aromatic ring having 6 to 30 carbon atoms, which may have a substituent; a heterocyclic ring having 3 to 30 carbon atoms, which may have a substituent; and an alkylene group having 1 to 30 carbon atoms, which may have a substituent. These rings or groups may be used in combination of at least two kinds. The substituent includes an aromatic ring having 6 to 29 carbon atoms; a heterocyclic ring having 3 to 29 carbon atoms; an alkyl group having 1 to 29 carbon atoms; a halogen atom; amino group, and the like.

Preferred examples of $R^2$ include a phenylene group which may have a substituent having 1 to 24 carbon atoms; an aliphatic alkylene group having 1 to 30 carbon atoms, preferably 1 to 20 carbon atoms; an aromatic ring-containing alkylene group having 7 to 30 carbon atoms; and a heterocyclic ring-containing alkylene group having 4 to 30 carbon atoms.

Preferred examples of $R^2O$ group include alkylene oxide groups having 2 to 7 carbon atoms, such as ethylene oxide group, (iso)propylene oxide group, tetramethylene oxide group, heptamethylene oxide group, hexamethylene oxide group, and combinations of at least two kinds of these alkylene oxide groups; phenylene oxide group; and the like.

$R^3$ is a monovalent hydrocarbon group which may have a hetero-atom. The hetero-atom includes nitrogen atom, oxygen atom and sulfur atom.

Representative examples of $R^3$ include an aromatic ring having 6 to 30 carbon atoms, which may have a substituent; a heterocyclic ring having 3 to 30 carbon atoms, which may have a substituent; and an alkyl group having 1 to 30 carbon atoms, which may have a substituent. The substituent includes an aromatic ring having 6 to 29 carbon atoms; a heterocyclic ring having 4 to 29 carbon atoms; a halogen atom; amino group, and the like.

Preferred examples of $R^3$ include phenyl group, an aliphatic alkyl group having 1 to 30 carbon atoms, preferably 1 to 20 carbon atoms, an aromatic ring-containing alkyl group having 7 to 30 carbon atoms, and a heterocyclic ring-containing alkyl group having 4 to 30 carbon atoms.

More preferred examples of $R^3$ include alkyl groups having 1 to 6 carbon atoms, such as methyl group, ethyl group, (iso)propyl group, (iso)butyl group, (iso)pentyl group and (iso)hexyl group; phenyl group, and the like.

p is a number of 1 to 60, out of which a number of 1 to 30 is preferable.

Concrete examples of the monomer represented by the formula (I) include methoxypolyethylene glycol (1-30: p value in the formula (I), hereinafter referred to the same) (meth)acrylates, methoxypolytetramethylene glycol (1-30) (meth)acrylates, ethoxypolyethylene glycol (1-30) (meth) acrylates, (iso)propoxypolyethylene glycol (1-30) (meth) acrylates, butoxypolyethylene glycol (1-30) (meth)acrylates, methoxypolypropylene glycol (1-30) (meth)acrylates, propoxypolypropylene oxide (1-30) (meth)acrylates, methoxy (ethylene glycol-propylene glycol copolymer) (1-30, out of which ethylene glycol: 1-29) (meth)acrylates, and the like. These monomers can be used alone or in admixture of at least two kinds. Among them, methoxypolyethylene glycol (1-30) (meth)acrylates are preferable. Incidentally, the term "(meth) acrylate" as used herein means acrylate or methacrylate. Also, the term "(iso)propoxy" as used herein means n-propoxy or isopropoxy.

The component (c) includes macromers which are monomers having a polymerizable unsaturated group and a number-average molecular weight of 500 to 100000, preferably 1000 to 10000. Among them, a silicone macromer represented by the formula (II):

wherein X is a polymerizable unsaturated group; Y is a divalent group; each of $R^4$ is independently hydrogen atom, a lower alkyl group, an aryl group or an alkoxy group, respectively; Z is a monovalent siloxane polymer residue having a number-average molecular weight of at least 500; q is 0 or 1; and r is an integer of 1 to 3, and/or a styrenic macromer having a polymerizable functional group at one end is preferable.

The number-average molecular weight of the macromer is determined by gel chromatography using polystyrene as a standard substance and chloroform containing 1 mmol/L of dodecyldimethylamine as a solvent.

The silicone macromer can be favorably used from the viewpoint of preventing scorching on the printer head of an inkjet printer.

In the silicone macromer represented by the formula (II), X includes a monovalent unsaturated hydrocarbon group having 2 to 6 carbon atoms, such as $CH_2=CH-$ group and $CH_2=C(CH_3)-$ group. Y includes divalent groups such as $-COO-$ group, a $-COOC_aH_{2a}-$ group, wherein a is an integer of 1 to 5, and a phenylene group. Among them, $-COOC_3H_6-$ is preferable. $R^4$ includes hydrogen atom; a lower alkyl group having 1 to 5 carbon atoms, such as methyl group and ethyl group; an aryl group having 6 to 20 carbon atoms, such as phenyl group; an alkoxy group having 1 to 20 carbon atoms, such as methoxy group, and the like. Among them, methyl group is preferable. Z is preferably a monovalent dimethylsiloxane polymer residue having a number-average molecular weight of 500 to 5000. q is 0 or 1, and preferably 1. r is an integer of 1 to 3, and preferably 1.

Representative examples of the silicone macromer include a silicone macromer represented by the formula (II-1):

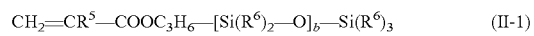

wherein $R^5$ is hydrogen atom or methyl group; each of $R^6$ is independently hydrogen atom or a lower alkyl group having 1 to 5 carbon atoms, respectively; and b is a number of 5 to 65; a silicone macromer represented by the formula (II-2):

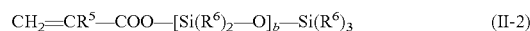

wherein $R^5$, $R^6$ and b are the same as defined above; a silicone macromer represented by the formula (II-3):

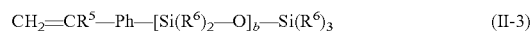

wherein Ph is a phenylene group; and $R^5$, $R^6$ and b are the same as defined above; a silicone macromer represented by the formula (II-4):

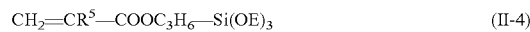

wherein $R^5$ is the same as defined above; E is a group represented by the formula: $-[Si(R^5)_2O]_c-Si(R^5)_3$, wherein $R^5$ is the same as defined above, and c is a number of 5 to 65; and the like.

Among them, the silicone macromer represented by the formula (II-1) is preferable, and a silicone macromer represented by the formula (II-1a):

wherein d is a number of 8 to 40, is especially preferable. Examples of the silicone macromer include a silicone macromer manufactured by CHISSO CORPORATION under the trade name of FM-0711, and the like.

The styrenic macromer can be favorably used, from the viewpoint of sufficient inclusion of an oil-soluble black dye or carbon black in the vinyl polymer.

The styrenic macromer includes styrene homopolymers having a polymerizable functional group at one end, or copolymers of styrene with the other monomer. Among them, those having acryloyloxy group or methacryloyloxy group as a polymerizable functional group at one end are preferable. It is desired that the content of styrene in the above-mentioned copolymer is at least 60% by weight, preferably at least 70% by weight, from the viewpoint of sufficient inclusion of carbon black in the vinyl polymer. The other monomer mentioned above includes acrylonitrile, and the like.

It is preferable that the number-average molecular weight of the styrenic macromer is 1000 to 10000.

The component (d) includes (meth)acrylates such as methyl (meth)acrylate, ethyl (meth)acrylate, (iso)propyl (meth)acrylate, (iso or tertiary)butyl (meth)acrylate, (iso) amyl (meth)acrylate, cyclohexyl (meth)acrylate, benzyl (meth)acrylate, 2-ethylhexyl (meth)acrylate, (iso)octyl (meth)acrylate, (iso)decyl (meth)acrylate, (iso)dodecyl (meth)acrylate, (iso)stearyl (meth)acrylate, 2-hydroxyethyl (meth)acrylate and 3-hydroxypropyl (meth)acrylate; styrenic monomers such as styrene, vinyltoluene, 2-methylstyrene and chlorostyrene; and the like. These can be used alone or in admixture of at least two kinds. Incidentally, "(iso or tertiary) butyl" means n-butyl, isobutyl or tertiary butyl. Also, "(iso)" means n- or iso.

It is preferable that the component (d) comprises a styrenic monomer from the viewpoints of improvements in optical density and high-lighter fastness. As the styrenic monomer, styrene and 2-methylstyrene are preferable. These styrenic monomers can be used alone or in admixture thereof. In this case, it is desired that the content of the styrenic monomer in the component (d) is 10 to 100% by weight, preferably 40 to 100% by weight, from the viewpoints of improvements in optical density and high-lighter fastness.

It is preferable that the component (d) comprises a hydroxyl group-containing monomer from the viewpoint of jetting stability in an inkjet printer. As the hydroxyl group-containing monomer, 2-hydroxyethyl (meth)acrylate and 3-hydroxypropyl (meth)acrylate are preferable, and these can be used alone or in admixture thereof. In this case, it is desired that the content of the hydroxyl group-containing monomer in the component (d) is 10 to 80% by weight, preferably 15 to 50% by weight, from the viewpoint of jetting stability in an inkjet printer.

It is desired that the content of the component (a) in the vinyl polymer is 1 to 50% by weight, preferably 5 to 40% by weight, from the viewpoint of dispersion stability of the dispersion obtained.

It is desired that the content of the component (b) in the vinyl polymer is 5 to 50% by weight, preferably 10 to 40% by weight, from the viewpoints of jetting stability and dispersion stability.

Also, it is preferable that the total content of the component (a) and the component (b) in the vinyl polymer is 6 to 75% by weight from the viewpoints of dispersion stability in water and jetting stability.

It is desired that the content of the component (c) in the vinyl polymer is 1 to 25% by weight, preferably 5 to 20% by weight, from the viewpoint of increasing the content of the oil-soluble black dye or carbon black and from the viewpoint of suppressing scorching on the heater surface of an inkjet printer.

It is desired that the content of the component (d) in the vinyl polymer is 5 to 93% by weight, preferably 10 to 80% by weight, from the viewpoint of suppression of scorching on the heater surface of an inkjet printer and from the viewpoint of stability. When the component (d) comprising the styrenic monomer is used, it is preferable that the content of the component (d) in the vinyl polymer is 10 to 60% by weight. Also, when the component (d) comprising the hydroxyl group-containing monomer is used, it is preferable that the content of the component (d) in the vinyl polymer is 1 to 30% by weight.

The vinyl polymer is prepared by polymerizing the components (a) to (d) by means of a known polymerization method such as a bulk polymerization method, a solution polymerization method, a suspension polymerization method, an emulsion polymerization method, or the like. Among these polymerization methods, the solution polymerization method is preferable.

The solvent used in the solution polymerization method is not limited to specified ones, and any of water-miscible organic solvents and water-insoluble organic solvents can be used. Examples of the solvent include an aliphatic alcohol having 1 to 3 carbon atoms; ketones such as acetone and methyl ethyl ketone; esters such as ethyl acetate; toluene, and the like. Among them, methanol, ethanol, acetone, methyl ethyl ketone or mixed solvents thereof with water are preferable.

Incidentally, a radical polymerization initiator can be used in the polymerization. As the radical polymerization initiator, any of azo compounds and organic peroxides may be used. It is preferable that the amount of the radical polymerization initiator is 0.001 to 5% by mol, especially 0.01 to 2% by mol based on the total amount of the components (a) to (d).

In the polymerization, a polymerization chain transfer agent may be further added. The polymerization chain transfer agent includes mercaptans, xanthogenndisulfides, thiuram disulfides, halogenated hydrocarbons, and the like. It is preferable that the amount of the polymerization chain transfer agent is usually 0.001 to 5 parts by weight based on 100 parts by weight of the monomers charged.

The conditions for polymerizing the components (a) to (d) differ depending upon kinds of the radical polymerization initiator, the monomers and the solvent used, and the like. The polymerization temperature is usually 30° to 100° C., preferably 50° to 80° C., and the polymerization time period is usually 1 to 20 hours. In addition, it is preferable that the polymerization atmosphere is an atmosphere of an inert gas such as nitrogen gas.

After the termination of the polymerization reaction, a copolymer can be isolated from the reaction solution by a known method such as reprecipitation or distilling off of the solvent. Also, the resulting copolymer can be purified by the removal of unreacted monomers and the like by the repeat of reprecipitation, membrane separation, chromatography or extraction.

The weight-average molecular weight of the vinyl polymer (as determined by the method described in Preparation Example 1) is preferably 3000 to 200000, more preferably 5000 to 100000, from the viewpoints of jettability, prevention of scorching on a printer head, durability of the water-based ink after printing, and stability of the dispersion.

The oil-soluble black dyes usable in the present invention include C. I. Solvent Black 3, C. I. Solvent Black 7, C. I. Solvent Black 27, C. I. Solvent Black 29, C. I. Solvent Black 34, Oil Black 860, and the like. Also, the carbon black includes Monarch 880, Monarch 280, Monarch 400, Regal 400R and Mogul L (hereinabove manufactured by Cabot Corporation, trade names); PRINTEX-L, PRINTEX-150T, PRINTEX-90, PRINTEX-60 and PRINTEX-80 (hereinabove manufactured by Degussa-AG, trade names); #950, #960 and MA600 (hereinabove manufactured by Mitsubishi Chemical Corporation, trade names), and the like.

It is desired that the total amount of the oil-soluble black dye and the carbon black is 20 to 400 parts by weight, preferably 30 to 300 parts by weight, based on 100 parts by weight of the resin solid content of the vinyl polymer, from the viewpoints of optical density and facilitation of inclusion of the black dye or the carbon black into the vinyl polymer.

The aqueous dispersion of the vinyl polymer particles comprising the oil-soluble black dye or the carbon black can be prepared by, for example, (i) a process comprising dissolving the vinyl polymer together with the oil-soluble black dye in a hydrophilic organic solvent, adding a neutralizing agent as occasion demands to cationize or anionize the salt-forming group of the polymer, adding water to the resulting mixture, and thereafter distilling off the hydrophilic organic solvent to phase-invert to a water-based system;

(ii) a process comprising dissolving the vinyl polymer in an organic solvent, adding a neutralizing agent as occasion demands to cationize or anionize the salt-forming group of the polymer, adding water and carbon black thereto and kneading the mixture, and distilling off the organic solvent from the kneaded product to give a water-based system;

(iii) a process comprising adding water, a neutralizing agent and, as occasion demands, a surfactant to a solution obtained by dissolving the vinyl polymer and the oil-soluble black dye in a water-insoluble organic solvent, to cationize or anionize the salt-forming group of the polymer, emulsifying the resulting mixture, and thereafter distilling off the water-insoluble organic solvent to give a aqueous dispersion; or the like.

The neutralizing agent usable for neutralizing the cationic group includes inorganic acids such as hydrochloric acid, nitrous acid, sulfuric acid and phosphoric acid; and organic acids such as a carboxylic acid having 1 to 5 carbon atoms, a dialkyl phosphoric acid having 2 to 20 carbon atoms, and oxyacids such as lactic acid, glycolic acid, glyceric acid and gluconic acid. Also, the neutralizing agent usable for neutralizing the anionic group includes alkali metal hydroxides such as sodium hydroxide, potassium hydroxide and lithium hydroxide; basic substances such as ammonia, triethylamine and morpholine; alcoholamines such as triethanolamine, diethanolamine and N-methyldiethanolamine, and the like. It is desired that the neutralization degree is adjusted so that the resulting aqueous dispersion becomes neutral.

The average particle diameter of the vinyl polymer particles including the oil-soluble black dye or the carbon black is preferably 0.01 to 0.50 μm, more preferably 0.02 to 0.20 μm, from the viewpoints of prevention of generation of blotting of the ink and stability of the dispersion.

The amount of the oil-soluble black dye or the carbon black is preferably 20 to 400 parts by weight, more preferably 30 to 300 parts by weight, based on 100 parts by weight of the solid content of the vinyl polymer, from the viewpoints of optical density and facilitation of inclusion of the oil-soluble black dye or the carbon black in the vinyl polymer.

It is desired that the amount of the water-insoluble vinyl polymer particles containing the oil-soluble black dye or the carbon black in the water-based ink comprising the aqueous dispersion is adjusted so that the content of the vinyl polymer particles in the water-based ink is usually 1 to 35% by weight, preferably 2 to 15% by weight, from the viewpoints of optical density and jetting stability.

The color ink refers to a color ink other than the black ink, for instance, an ink comprising a pigment or dye which is yellow, magenta, cyan or the like. The color ink includes, an aqueous pigment dispersion containing a dispersant, an aqueous dispersion of polymer particles containing a pigment or dye, an aqueous solution or aqueous dispersion of a dye, and the like. In addition, the vinyl polymer particles used in the black ink has an ionicity opposite to that of the color ink. Specifically, for instance, when the ionicity of the vinyl polymer particles used in the black ink is cationic, the ionicity of the color ink is anionic, and when the ionicity of the vinyl polymer particles of the black ink is anionic, the ionicity of the color ink is cationic.

Here, the ionicity is determined, for example, by potentiometric titration or determination of pH in the case of a water-soluble dye, or by determination of zeta potential in the case of a dispersion.

Since the ink is excellent in bleeding resistance (no blotting is generated on its periphery) based on that the ionicity of the oil-soluble black dye or the carbon black is opposite to that of the color ink, very clear printouts can be obtained.

The ink set of the present invention may be either a combination in which an oil-soluble black dye or carbon black used in the black ink is anionic, and the color ink is cationic; or a combination in which an oil-soluble black dye or carbon black used in the black ink is cationic, and the color ink is anionic. Many of anionic dyes show good color development, and especially acidic dyes are preferable. Therefore, it is preferable that the black ink is cationic when the color ink is anionic, from the viewpoint of broadening the selection of dyes.

Further, it is preferable to use an aqueous dispersion of vinyl polymer particles containing a dye or pigment as the color ink from the viewpoints of water resistance and high fixing ability.

Various additives which have been generally widely used, for instance, a wetting agent such as a polyhydric alcohol, a dispersant, a defoaming agent, a mildewproof agent, a chelating agent, and the like can be properly added to the black ink and the color ink in the present invention.

Since the aqueous dispersion of the vinyl polymer particles containing the oil-soluble black dye or the carbon black as described above is excellent in fixing ability, the aqueous dispersion is excellent in rubbing resistance, high-lighter fastness, and water resistance, and shows little blotting.

EXAMPLES

The units "parts" and "%" as used in each of Examples and Comparative Examples are based upon weight.

Preparation Example 1

A reaction vessel was charged with 20 parts of methyl ethyl ketone as a polymerization solvent, monomers and a polymerization chain transfer agent which are listed in the column of initially charged monomers of Table 1, and nitrogen gas replacement was sufficiently carried out.

On the other hand, after a dropping funnel was subjected to sufficient nitrogen gas replacement, the dropping funnel was charged with monomers and a polymerization chain transfer agent which are listed in the column of dropping monomers of Table 1, 60 parts of acetone and 0.2 parts of 2,2'-azobis(2,4-dimethylvaleronitrile). The temperature of the mixed solution inside the reaction vessel was raised to 65° C. with stirring under nitrogen atmosphere, and the mixed solution inside the dropping funnel was gradually added dropwise thereto over a period of 3 hours. After 2 hours passed from the termination of dropping, thereto was added a solution prepared by dissolving 0.1 parts of 2,2'-azobis(2,4-dimethylvaleronitrile) in 5 parts of methyl ethyl ketone. The mixture was further aged at 65° C. for 2 hours and then at 70° C. for 2 hours, to give a copolymer solution.

A part of the resulting copolymer solution was isolated by drying the solution at 105° C. for 2 hours under reduced pressure to completely remove the solvent. The molecular weight was determined by gel permeation chromatography using polystyrene as a standard substance, and chloroform containing dodecyldimethylamine of 1 mmol/L as a solvent. As a result, the copolymer had a weight-average molecular weight of 10000.

The resulting copolymer solution was dried under reduced pressure. To 5 parts of the resulting copolymer were added 25 parts of an organic solvent listed in Table 1 and 5 parts of an oil-soluble black dye listed in Table 1, and completely dissolved. To the resulting solution was added a neutralizing agent (30% aqueous solution) listed in Table 1 with stirring to partly neutralize a salt-forming group of the copolymer. Thereto was added 300 parts of ion-exchanged water, and thereafter the mixture was emulsified using Microfluidizer (manufactured by Microfluidizer) for 30 minutes.

The organic solvent was completely removed from the resulting emulsion at 60° C. under reduced pressure. Further, the mixture was concentrated by removing a part of water, to give a cationic aqueous dispersion of vinyl polymer particles containing an oil-soluble black dye (hereinafter referred to as "BK-1"), the concentration of the solid ingredients of which was 10%.

Preparation Example 2

A copolymer solution was obtained in the same manner as in Preparation Example 1 using the monomers and a polymerization chain transfer agent which are listed in Table 1. The molecular weight was determined in the same manner as in Preparation Example 1. As a result, the copolymer had a weight-average molecular weight of 10000.

Five parts of a copolymer obtained by drying the resulting copolymer solution under reduced pressure was dissolved in 25 parts of an organic solvent listed in Table 1. To the resulting solution was added a neutralizing agent (30% aqueous solution) listed in Table 1 with stirring to partly neutralize a salt-forming group of the copolymer. Thereto were further added 50 parts of ion-exchanged water and 5 parts of carbon black listed in Table 1, and the mixture was kneaded with a beads-mill. The organic solvent was completely removed from the resulting kneaded mixture at 60° C. under reduced pressure. Further, the mixture was concentrated by removing a part of water, to give a cationic aqueous dispersion of vinyl polymer particles containing carbon black (hereinafter referred to as "BK-2"), the concentration of the solid ingredients of which was 10%.

Each compound listed in Table 1 means the followings:
1) silicone macromer: manufactured by CHISSO CORPORATION under the trade name of FM-0711;
2) styrenic macromer: manufactured by TOAGOSEI CO., LTD. under the trade name of AS-6 [styrene homopolymerized macromer having a number-average molecular weight of 6000]; and
3) styrene-acrylonitrile macromer: manufactured by TOAGOSEI CO., LTD. under the trade name of AN-6 [styrene content: 75% by weight, number-average molecular weight: 6000].

TABLE 1

| Prep. Ex. No. | 1 (BK-1) | 2 (BK-2) |
|---|---|---|
| Initially Charged Monomers and Polymerization Chain Transfer Agent (parts) | t-Butyl Methacrylate (20) N,N-Dimethylaminoethyl Methacrylate (20) Methoxypolyethylene Glycol (n = 9) Methacrylate (5) 2-Hydroxyethyl Methacrylate (2) Silicone Macromer FM-0711 (2) n-Dodecylmercaptan (0.2) | Styrene (9) Lauryl Methacrylate (2) N,N-Dimethylaminoethyl Methacrylate (15) Methoxypolyethylene Glycol (n = 4) Methacrylate (15) Styrenic Macromer AS-6 (5) Mercaptoethanol (0.2) |
| Dropping Monomers and Polymerization Chain Transfer Agent (parts) | t-Butyl Methacrylate (20) N,N-Dimethylaminoethyl Methacrylate (20) Methoxypolyethylene Glycol (n = 9) Methacrylate (5) 2-Hydroxyethyl Methacrylate (2) Silicone Macromer FM-0711 (2) n-Dodecylmercaptan (1.8) | Styrene (10) Lauryl Methacrylate (2) N,N-Dimethylaminoethyl Methacrylate (15) Methoxypolyethylene Glycol (n = 4) Methacrylate (20) Styrenic Macromer AS-6 (5) Mercaptoethanol (1.8) |
| Dye/Pigment | Oil Black 860*[1] | Carbon Black Monarch 880*[2] |
| Organic Solvent | Acetone | Methyl Ethyl Ketone |
| Neutralizing Agent | Glycolic Acid (3.2) | Gluconic Acid (5.2) |

(Note)
*[1]: manufactured by Orient Chemical Co., Ltd., trade name
*[2]: manufactured by Cabot Corporation, trade name Preparation Example 3

Ten parts of carbon black having a surface area of 230 m$^2$/g and a DBP oil absorption of 70 m$^2$/g and 3.06 parts of 3-amino-N-ethylpyridinium bromide were thoroughly mixed with 72 parts of water. Thereafter, 1.62 parts of nitric acid was added dropwise thereto, and the mixture was stirred at 70° C. After 4 minutes passed, a solution prepared by dissolving 1.07 parts of sodium nitrite in 5 parts of water was added thereto, and the mixture was stirred for additional 1 hour. The resulting slurry was filtered with Toyo Roshi No. 2 (manufactured by ADVANTICE), and the carbon black particles were sufficiently washed with water. This wet cake-like carbon black was re-dispersed in 3000 mL of water, and desalted with a reverse osmotic membrane until the electric conductivity attained to 0.2 μs. Further, this liquid dispersion of carbon black was concentrated to a carbon black concentration of 10%, thereby giving a cationic, self-dispersible carbon black aqueous dispersion, to the surface of which a group represented by the formula:

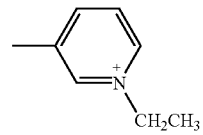

was bonded (hereinafter referred to as BK-3).

Example 1

A black ink comprising a cationic colorant composed of the following components and anionic color inks of yellow, magenta and cyan composed of the following components were combined together to give an ink set. Each ink was prepared by mixing each of the components, and filtering with a microfilter having a pore size of 5 μm as to the black ink or with a microfilter having a pore size of 0.45 μm as to the other inks under pressure, to give an ink.

| [Components] | |
|---|---|
| 1) Black Ink | |
| BK-1 | 80 parts |
| Glycerol | 5 parts |
| Ethylene Glycol | 5 parts |
| Isopropyl Alcohol | 2 parts |
| Acetylenol EH (manufactured by Kawaken Fine Chemicals Co., Ltd., trade name) | 2 parts |
| Water | 6 parts |
| 2) Color Inks | |
| <Yellow> | |
| C.I. Acid Yellow 25 | 4 parts |
| Glycerol | 5 parts |
| Diethylene Glycol | 5 parts |
| Urea | 5 parts |
| Sodium polyoxyethylene lauryl ether sulfate [manufactured by Kao Corporation under the trade name of EMAL 20C] | 1 part |
| Water | 80 parts |
| <Magenta> | |
| C.I. Acid Red 51 | 4 parts |
| Glycerol | 5 parts |
| ε-Caprolactam | 5 parts |
| Urea | 5 parts |

-continued

| [Components] | |
|---|---|
| EMAL 20C [manufactured by Kao Corporation, trade name] | 1 part |
| Water | 80 parts |
| <Cyan> | |
| C.I. Acid Blue 59 | 4 parts |
| Glycerol | 5 parts |
| 2-Pyrrolidone | 5 parts |
| Urea | 5 parts |
| EMAL 20C [manufactured by Kao Corporation, trade name] | 1 part |
| Water | 80 parts |

Example 2

The same procedures as in Example 1 were carried out except that the black colorant BK-1 was changed to BK-2 in the black ink, to give an ink set.

Comparative Example 1

The same procedures as in Example 1 were carried out except that an anionic black ink composed of the following components was used as the black ink, to give an ink set.

| 1) Black Ink | |
|---|---|
| C.I. Direct Black 195 | 4 parts |
| Glycerol | 5 parts |
| 2-Pyrrolidone | 5 parts |
| Urea | 5 parts |
| Isopropyl Alcohol | 2 parts |
| EMAL 20C [manufactured by Kao Corporation, trade name] | 1 part |
| Water | 78 parts |

Comparative Example 2

The same procedures as in Example 1 were carried out except that a cationic black ink composed of the following components was used as the black ink, to give an ink set.

| 1) Black Ink | |
|---|---|
| BK-3 | 4 parts |
| Glycerol | 5 parts |
| Urea | 10 parts |
| Isopropyl Alcohol | 2 parts |
| Acetylenol EH (manufactured by Kawaken Fine Chemicals Co., Ltd., trade name) | 1 part |
| Water | 78 parts |

The physical properties for the ink sets obtained in Examples 1 and 2 and Comparative Examples 1 and 2 were evaluated by the following methods. The results are shown in Table 2.

<Evaluation Methods>

(1) Printing Property of Black Ink

An extent of distortion was observed with naked eyes when ruled lines were printed on a regenerated paper for PPC (manufactured by Nippon Kako Seishi K.K.) using a commercially available bubble jet printer manufactured by CANON INC. (model number: BJC-430), and evaluated on the basis of the following evaluation criteria.

(Evaluation Criteria)
◎: No distortion
○: Little distortion
Δ: Some distortion
x: Distortion (2) Water Resistance of Black Ink Solid image printing was carried out with a black ink on the regenerated paper for PPC by using the above-mentioned printer, and dried at room temperature (about 25° C.) for 1 hour. Thereafter, the printed copy paper was immersed in stand-still water for 10 seconds, and the paper was vertically lifted therefrom. After drying the paper in the air at room temperature (about 25° C.), the residual ratio of the optical density after immersion to the initial optical density was obtained. The water resistance was evaluated on the basis of the following evaluation criteria:

(Evaluation Criteria)
◎: Residual ratio being at least 95%
○: Residual ratio being at least 90% and less than 95%
Δ: Residual ratio being at least 70% and less than 90%
x: Residual ratio being less than 70%

(3) Rubbing Resistance of Black Ink

Solid image printing was carried out with a black ink on the regenerated paper for PPC using the above-mentioned printer. After the paper was dried for 1 day at room temperature (about 25° C.), the printed surface was strongly rubbed with a finger. The extent of rub-off of the printed image was observed with naked eyes, and evaluated on the basis of the following evaluation criteria:

(Evaluation Criteria)
○: Substantially no printed image being rubbed off, and its periphery being not stained.
Δ: Some printed images being rubbed off, its periphery being stained, and finger also being stained a little.
x: Printed images being considerably rubbed off, its periphery being considerably stained, and finger also being considerably stained.

(4) High Lighter-Fastness of Black Ink

Text printing was carried out with a black ink on the regenerated paper for PPC by using the above-mentioned printer. After 6 hours passed, the extent of staining of the printed sample was observed with naked eyes after being traced with a commercially available aqueous fluorescent marker, and evaluated on the basis of the following evaluation criteria:

(Evaluation Criteria)
○: No stains such as rubbed stains were observed even when traced with a fluorescent marker.
Δ: Some rubbed stains were generated when traced with a fluorescent marker, but such stains would cause no problems in practical uses.
x: Generation of rubbed stains was observed when traced with a fluorescent marker, and the stains were considerably noticeable.

(5) Bleeding Resistance Between Black Ink and Color Inks

Solid image printing was carried out with a black ink out of each ink set on the regenerated paper for PPC by using the above-mentioned printer. Immediately thereafter, solid image printing of each color ink was carried out, so that an adjoining portion to the previous solid image was printed with a yellow, magenta or cyan ink. The boundary portion of the resulting solid image printing was observed with naked eyes, and the bleeding between the black ink and the color ink was evaluated on the basis of the following evaluation criteria.

(Evaluation Criteria)
◎: No bleeding being recognized on its entire periphery
○: Slight bleeding being recognized but not to be noted
Δ: Some bleeding being recognized
x: Noticeable bleeding being recognized on almost the entire periphery

TABLE 2

| Ex. No. | Printing Property of Black Ink (Distortion) | Water Resistance of Black Ink | Rubbing Resistance of Black Ink | High Lighter-Fastness of Black Ink | Bleeding Resistance |
|---|---|---|---|---|---|
| 1 | ◎ | ◎ | ○ | ○ | ○ |
| 2 | ○ | ◎ | ○ | ○ | ○ |
| Comp. Ex. | | | | | |
| 1 | ◎ | x | ○ | Δ | x |
| 2 | Δ | Δ | x | x | ○ |

It can be seen from the above results that all of the ink sets obtained in Examples are excellent in printing property, water resistance, rubbing resistance and high-lighter fastness of the black ink, and also are excellent bleeding resistance.

INDUSTRIAL APPLICABILITY

Since the ink set of the present invention is excellent in jettability, water resistance and fixing ability, and further excellent in bleeding resistance and can form very clear printed characters, the ink set can be suitably used as a water-based ink for inkjet recording.

The invention claimed is:

1. An ink set comprising a black ink and a color ink, wherein the black ink consists essentially of an aqueous dispersion of anionic water-insoluble vinyl polymer particles containing (i) a vinyl polymer and (ii) carbon black, and wherein the water-insoluble anionic vinyl polymer particles have an ionicity opposite to that of the color ink, and said vinyl polymer comprises a water-insoluble vinyl polymer prepared by copolymerizing (a) a salt forming group-containing monomer, (b) a monomer represented by the formula (I):

$$CH_2=C(R^1)COO(R^2O)_p R^3 \quad (I)$$

wherein $R^1$ is hydrogen atom or a lower alkyl group, $R^2$ is a divalent hydrocarbon group which may have a hetero-atom, $R^3$ is a monovalent hydrocarbon group which may have a hetero-atom, and p is a number of 1 to 60, (c) a styrenic macromer having a polymerizable functional group at one end, and (d) a styrenic monomer copolymerizable with these monomers.

2. The ink set according to claim 1, wherein the styrenic macromer is a styrene homopolymer having a polymerizable functional group at one end.

3. The ink set according to claim 1, wherein the styrenic macromer has a number-average molecular weight of 1000 to 10000.

4. The ink set according to claim 1, wherein the styrene monomer is at least one styrenic monomer selected from the group consisting of styrene, vinyltoluene, 2-methylstyrene and chlorostyrene.

* * * * *